Nov. 1, 1938.   A. G. PLATT   2,135,110
POWER APPARATUS
Filed May 19, 1937   2 Sheets-Sheet 1

Nov. 1, 1938.  A. G. PLATT  2,135,110
POWER APPARATUS
Filed May 19, 1937  2 Sheets-Sheet 2
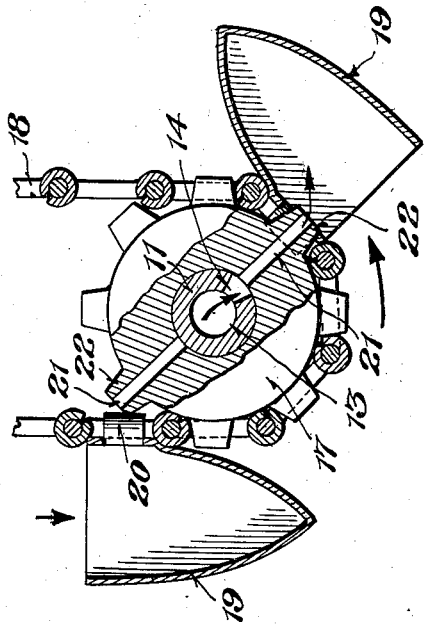
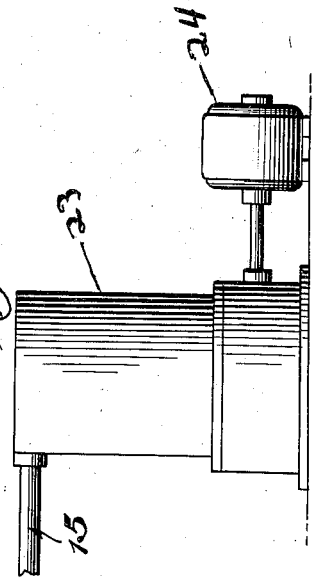
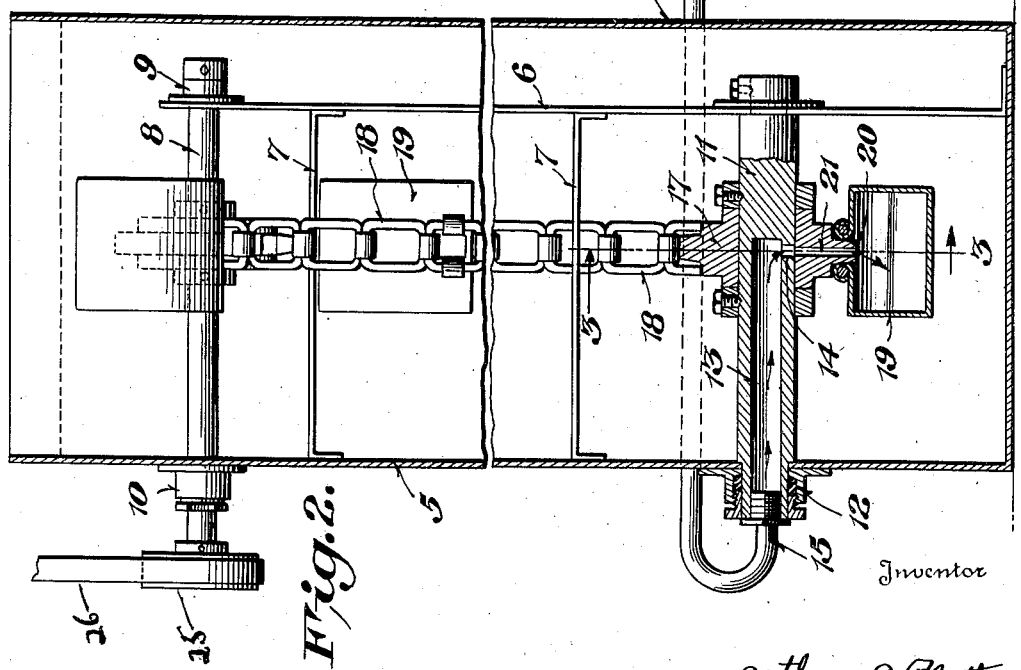
Inventor
Arthur G. Platt,
By Royal E. Burnham,
Attorney Patented Nov. 1, 1938

2,135,110

UNITED STATES PATENT OFFICE 2,135,110

POWER APPARATUS

Arthur G. Platt, Edgewood, Iowa

Application May 19, 1937, Serial No. 143,609

2 Claims. (Cl. 60—22)

This invention relates to apparatus in which a plurality of buckets are mounted on an endless chain disposed in substantially vertical position and carried by toothed wheels one above the other, the buckets, during all or most of their travel with the chain, being immersed in water.

It is an object of the invention to provide effective means whereby air is injected into the buckets and water displaced therefrom after they have turned with the chain on the lower wheel to begin their upward run with their open ends down, the buckets on the down run having their open ends up. The buckets thus are lighter during their upward movement than during their downward movement filled with water, and this causes the chain to move and turn the wheels on which it is mounted.

When considered with the description herein, the characteristics of the invention are apparent from the accompanying drawings, which exemplify an embodiment of the invention for purposes of illustration, and in which—

Fig. 2 is a section on the line 2—2, Fig. 1;

Fig. 3 is a section on the line 3—3, Fig. 2;

Fig. 4 is a view of an air-supply means.

Figure 1:
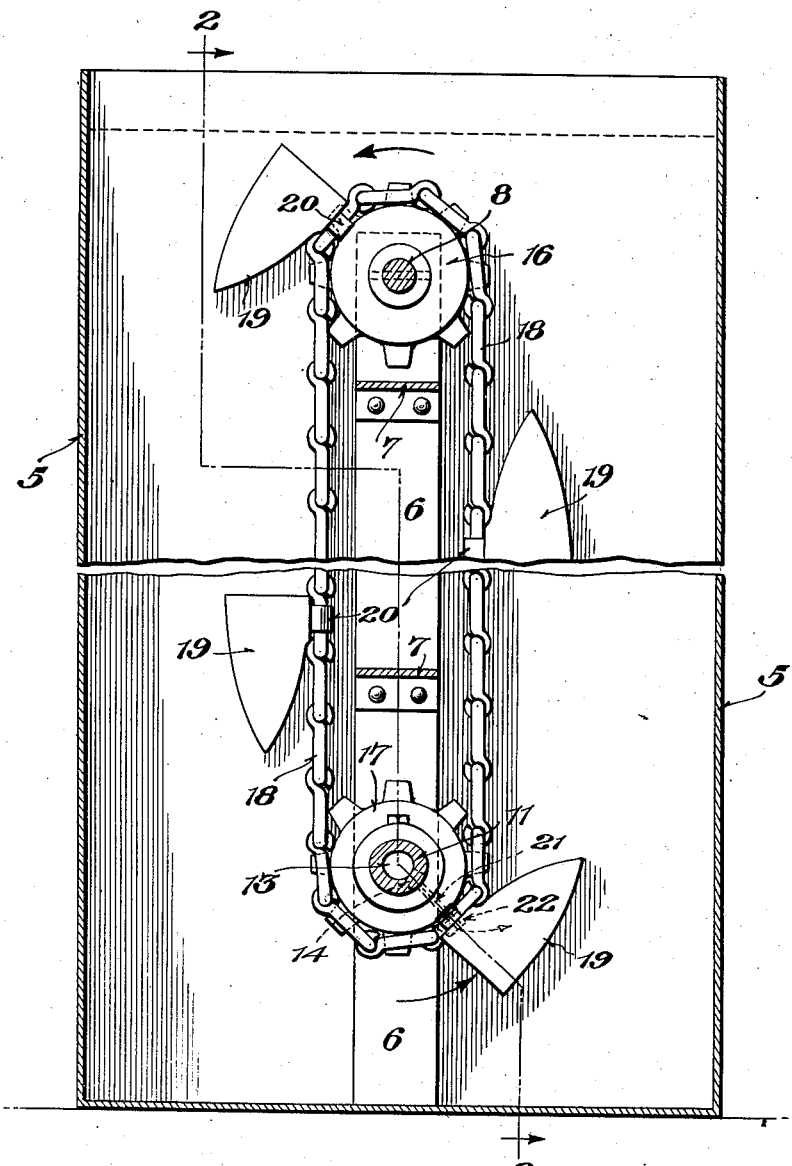
Fig. 1 is an elevation, the tank being shown in section.

The operating parts of the apparatus are disposed in a tank or other suitable container 5, which normally is filled, or almost filled, with water or other suitable liquid. Mounted in the tank near one of its walls is an upright member 6, which is braced by struts 7 connected to it and to the opposite tank-wall.

A horizontal rotatable shaft 8 is journaled near the top of the tank in a bearing 9 on member 6 and in a stuffing-box 10 on the tank-wall.

Another horizontal shaft 11, near the bottom of the tank and directly under shaft 8, is mounted at one end in member 6 and held against rotation, and at the other end it is mounted in the tank-wall and extends outwardly thereof through a stuffing-box 12.

The shaft 11 contains a longitudinal passage or bore 13, which extends from its outer end to a radial port 14 that leads to the periphery of the shaft. The passage is supplied with air under pressure by a pipe 15 connected to the outer end of the shaft.

A toothed or sprocket wheel 16 is fast on the upper shaft 8, and a similar wheel 17 directly thereunder is journaled on shaft 11. A sprocket-chain 18 is mounted over these wheels.

A plurality of buckets or equivalent members 19 open at one end are mounted in equally-spaced positions on links of the chain in such manner that all of those on the upward run of the chain between the wheels 17 and 16 have their open ends down and all of those on the other and downward run of the chain between the wheels 16 and 17 have those ends up.

As seen particularly in Fig. 3, each bucket has a lateral opening 20 near its open end. The opening is alined with the open part of the link to which the bucket is attached, whereby a tooth of the sprocket-wheel entering the link registers with the opening.

The lower wheel 17 has one or more radial passages 21, extending from its bore on shaft 11 to the outer end of a tooth, each passage being positioned for periodical and momentary registry at its inner end with radial port 14 during rotation of the wheel. The arrangement and coordination of the instrumentalities are such that one of the ported teeth of wheel 17 always enters a chain-link to which a bucket is attached and the passage thereof becomes alined with the port 14 when the bucket is beginning its upward movement. The outer end of the port 14 is of sufficient arcuate length to permit enough air to be forced through passage 21 into the bucket to displace the water therein while the inner end of the passage is passing across the end of port 14 during rotation of the wheel. During the other period of rotation of the wheel, its passage 21 is closed by the shaft 11.

The number of ported teeth required depends upon the number of buckets on the chain. As seen in Fig. 3, in the embodiment disclosed the wheel 17 has two diametrically positioned teeth 22, each of which has a passage 21, and these two teeth with passages are sufficient for the number of buckets shown. Although one of these teeth comes into registry with the lateral opening in a bucket near the end of its downward movement, no air is blown into the bucket until it has reached the position in which the next preceding bucket is shown, when its passage comes into alinement with the shaft-port 14 while the bucket is assuming the inverted position.

Air is supplied by any suitable means to the bore of shaft 11 through pipe 15 under sufficient pressure for its emission from the passages 21. For example, as shown by Fig. 4, a conventional air-compressor 23, driven by an electric motor 24, may be used.

Power may be taken off the apparatus by any desired suitable means, as, for example, by a wheel 25 on the upper shaft and a belt 26.

Operation of the apparatus is apparent from the drawings and the foregoing description. During downward movement of the buckets, with their open ends upward, they are filled with water. After they pass under the lower wheel 17, and while they are assuming the inverted positions in which they move upwardly, air is forced into them near the bottom from passages 21 for sufficient time for the air to displace the water in them, the air rising in the buckets and thus taking the place of the water. As the air is forced directly into the buckets, none is lost and less is required than would be the case if some of it rose in the water outside of the buckets. The air-containing buckets being lighter than those filled with water on the other side, they rise in the water and drive the chain and thus drive the upper wheel 16 and the shaft 8 to which it is fast. As the buckets turn over the upper wheel, they become filled with water.

What I claim as new, and desire to secure by Letters Patent, is—

1. An apparatus operable while immersed in liquid comprising an upper rotatable shaft, a toothed wheel fast thereon, therebelow a shaft having a longitudinal passage therein and a port extending radially therefrom to the shaft periphery, a toothed wheel journalled on said lower shaft over said port and having a radial passage positioned to register at its inner end with said port during a period of its rotation and extending to the end of a tooth of the wheel, a chain on said wheels, buckets attached to said chain having lateral openings positioned to receive air from said wheel passage, and means whereby air is supplied under pressure to said longitudinal passage, said shaft-port being positioned for registry with said wheel passage in the period a bucket is assuming inverted position during movement of the chain.

2. An apparatus operable while immersed in liquid comprising an upper rotatable shaft, a toothed wheel fast thereon, therebelow a shaft having a longitudinal passage therein and a port extending radially therefrom to the shaft periphery, a toothed wheel journaled on said lower shaft over said port and having a radial passage positioned to register at its inner end with said port during a period of its rotation and extending to the end of a tooth of the wheel, an endless chain on said wheels, buckets attached to links of said chain, each of said buckets having a lateral opening alined with an open part of a chain-link whereby a tooth of said lower wheel entering said link registers with said opening and its passage discharges directly into said bucket, and means whereby air is supplied under pressure to said longitudinal shaft-passage, said shaft-port being positioned for registry with said wheel-passage in the period a bucket is assuming inverted position during movement of said chain.

ARTHUR G. PLATT.